(12) United States Patent
Iwano

(10) Patent No.: US 10,307,965 B2
(45) Date of Patent: Jun. 4, 2019

(54) MANUFACTURING METHOD FOR JOINED BODY

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 359 days.

(21) Appl. No.: 15/284,796

(22) Filed: Oct. 4, 2016

(65) Prior Publication Data

US 2017/0113399 A1 Apr. 27, 2017

(30) Foreign Application Priority Data

Oct. 22, 2015 (JP) ................................. 2015-208369

(51) Int. Cl.
  *B32B 37/00* (2006.01)
  *B29C 65/06* (2006.01)
  (Continued)

(52) U.S. Cl.
  CPC ........ *B29C 65/0618* (2013.01); *B29C 66/112* (2013.01); *B29C 66/131* (2013.01); *B29C 66/1312* (2013.01); *B29C 66/301* (2013.01); *B29C 66/322* (2013.01); *B29C 66/524* (2013.01); *B29C 66/543* (2013.01); *B29C 66/547* (2013.01); *B29C 66/61* (2013.01); *B29C 66/636* (2013.01); *B29C 66/721* (2013.01); *B29C 66/7212* (2013.01); *B29C 66/7392* (2013.01); *B29C 66/73921* (2013.01);
  (Continued)

(58) Field of Classification Search
  CPC ... B29C 65/06; B29C 65/0618; B29C 66/112; B29C 66/131; B29C 66/1312; B29C 66/301; B29C 66/322; B29C 66/524; B29C 66/543; B29C 66/547; B29C 66/61; B29C 66/636; B29C 66/721; B29C 66/7212; B29C 66/7392; B29C 66/73921; B29C 66/81431; B29C 66/8322
  USPC ...................................................... 156/73.5
  See application file for complete search history.

(56) References Cited

U.S. PATENT DOCUMENTS 4,058,421 A  11/1977 Summo
4,601,927 A   7/1986 Durfee
(Continued)

FOREIGN PATENT DOCUMENTS

JP    S57-157717 A   9/1982
JP    S58-059035 A   4/1983
(Continued)

*Primary Examiner* — James D Sells
(74) *Attorney, Agent, or Firm* — Oliff PLC

(57) ABSTRACT

A manufacturing method for a joined body, includes: bringing a first member and a second member into contact with each other, at least one of the first member and the second member being made of thermoplastic resin, and the second member having a recessed portion on a joining surface to be joined to the first member; and welding the first member and the second member together, including welding a contact portion of the first member and the second member by melting the thermoplastic resin by frictional heat generated in the contact portion by relative movement of the first member and the second member, in a state in which the first member and the second member are in contact with each other.

7 Claims, 7 Drawing Sheets

(51) Int. Cl.
*B29C 65/00* (2006.01)
*B60R 19/18* (2006.01)
B29L 31/30 (2006.01)
B29K 701/12 (2006.01)
B60R 19/04 (2006.01)

(52) U.S. Cl.
CPC .... *B29C 66/81431* (2013.01); *B29C 66/8322* (2013.01); *B60R 19/18* (2013.01); *B29C 66/71* (2013.01); *B29C 66/72141* (2013.01); *B29C 66/72143* (2013.01); *B29K 2701/12* (2013.01); *B29L 2031/30* (2013.01); *B29L 2031/3044* (2013.01); *B60R 19/04* (2013.01); *B60R 2019/1833* (2013.01); *B60R 2019/1853* (2013.01)

(56) References Cited

U.S. PATENT DOCUMENTS

| | | | | |
|---|---|---|---|---|
| 5,288,350 A * | 2/1994 | Kita | ........................ | B29C 65/08 |
| | | | | 156/293 |
| 8,695,797 B2 * | 4/2014 | Maier | .................. | H05K 5/0013 |
| | | | | 206/320 |
| 2007/0262488 A1 | 11/2007 | Chen | | |

FOREIGN PATENT DOCUMENTS

| | | | |
|---|---|---|---|
| JP | 2000-006245 A | 1/2000 | |
| JP | 2000-025117 A | 1/2000 | |
| JP | 2000-127245 A | 5/2000 | |
| JP | 2002-089388 A | 3/2002 | |
| JP | 2012-125948 A | 7/2012 | |
| JP | 2013-043370 A | 3/2013 | |
| JP | 2013-158914 A | 8/2013 | |

* cited by examiner

MANUFACTURING METHOD FOR JOINED BODY

INCORPORATION BY REFERENCE

The disclosure of Japanese Patent Application No. 2015-208369 filed on Oct. 22, 2015 including the specification, drawings and abstract is incorporated herein by reference in its entirety.

BACKGROUND

1. Field of the Disclosure

The disclosure relates to a manufacturing method for a joined body.

2. Description of Related Art

Technology for welding a plurality of members made of thermoplastic resin material together is known (see Japanese Patent Application Publication No. 2012-125948 (JP 2012-125948 A) and Japanese Patent Application Publication No. 2013-43370 (JP 2013-43370 A)). For example, JP 2012-125948 A describes technology in which an edge portion of a first member formed by a molded article of fiber reinforced thermoplastic resin is joined, by vibration welding, to an edge portion of a second member that is also formed by a molded article of fiber reinforced thermoplastic resin.

SUMMARY

In cases such as when the area of portions to be joined by vibration welding is wide, it may be difficult to stably ensure dimensional accuracy over the entire region of the portions to be joined. Also, with the related art, if the dimensional accuracy of the portions to be joined is low, weld quality ends up decreasing, so there is room for improvement in terms of more stably ensuring weld quality.

The disclosure provides a manufacturing method for a joined body capable of more stably ensuring weld quality.

A manufacturing method for a joined body, according to an aspect of the disclosure includes: contacting step of bringing a first member and a second member into contact with each other, at least one of the first member and the second member being a member made of thermoplastic resin, and the second member having a recessed portion on a joining surface to be joined to the first member; and welding step of welding the first member and the second member together, the welding step including welding a contact portion of the first member and the second member by melting the member made of the thermoplastic resin by frictional heat, the frictional heat being generated in the contact portion by relative movement of the first member and the second member in a state in which the first member and the joining surface of the second member are in contact with each other and are pressed together.

In the above aspect, the welding step may include welding the recessed portion and a facing portion that faces the recessed portion together, by introducing melted thermoplastic resin into the recessed portion.

In the above aspect, the welding step may include melting the recessed portion, the facing portion, and the thermoplastic resin introduced into the recessed portion, by heat transferred from the contact portion to the recessed portion and the facing portion.

In the above aspect, the relative movement may be vibration of at least one of the first member and the second member.

In the above aspect, both of the first member and the second member may be made of thermoplastic resin.

According to this structure, in the welding step, first, a portion of the joining surface of the second member excluding the recessed portion is brought into contact with and pressed against the first member. Therefore, the area of the contact portion of the first member and the second member is able to be reduced, and reaction force (force in the direction opposite the pressing direction) due to weld flash produced at the contact portion at the time of vibration welding is able to be reduced, by the amount of the recessed portion that is formed. Therefore, the first member and the second member are able to be placed in a desired pressure-contact state with little pressure, compared to a comparative example in which the recessed portion is not formed.

Also, in the welding step, the contact portion is melted and welded by generating frictional heat by vibration in the contact portion of the first member and the second member. The recessed portion and the facing portion that faces the recessed portion are welded by introducing some weld flash produced from the contact portion into the recessed portion, and by melting the recessed portion, the facing portion, and the weld flash in the recessed portion, with heat transferred from the contact portion to the recessed portion and the facing portion. As a result, not only the contact portion, but also the recessed portion and the facing portion, is able to be welded, so weld quality is able to be ensured even if the dimensional accuracy of the portions to be joined is not high.

In the above aspect, reinforcing fibers may be blended into the first member and the second member.

In the above aspect, the second member may have an elongated shape; and the recessed portion may be provided such that an end of the recessed portion does not reach an end of the joining surface of the second member, in a sectional view orthogonal to a longitudinal direction of the second member.

In the above aspect, the first member may have an elongated shape. The first member may include a pair of flange portions on respective ends of the first member in a sectional view orthogonal to a longitudinal direction of the first member. The second member may include a pair of flange portions on respective ends in the sectional view orthogonal to the longitudinal direction of the second member. The first member and the second member may be configured such that a closed cross-section is formed by the pair of flange portions of the first member and the pair of the flange portions of the second member being joined together. The recessed portion may be provided on the flange portions of the second member.

According to this structure, in the welding step, both end portions of the joining surface of the flange portions of the second member in a sectional view orthogonal to the longitudinal direction of the second member are able to be made to contact the flange portions of the first member, even if excessive pressure is not applied. Therefore, pressure is able to be stably applied to the flange portions of the second member, so the flange portions of the second member are able to be stably welded to the flange portions of the first member.

In the above aspect, the recessed portion may be a groove that extends over substantially an entire length of the second member in the longitudinal direction of the second member.

According to this structure, the recessed portion is a groove that extends over substantially the entire length of the second member in the longitudinal direction thereof, so the flange portions of the second member are able to be stably welded over substantially the entire length in the longitudinal direction thereof, compared to a structure in which a plurality of recessed portions are scattered about.

In the above aspect, the relative movement may be vibration of at least one of the first member and the second member in a direction parallel to the joining surface and perpendicular to the longitudinal direction of the second member.

In the above aspect, the first member and the second member may be each formed in a elongated shape having a longitudinal direction, and each may have a shape in a sectional view orthogonal to the longitudinal direction of each that is hat-shaped, and each may include a pair of flange portions and a U-shaped portion with a U-shaped cross-section. Each of the U-shaped portions may have a base wall portion and a pair of facing wall portions. The first member may include a first frame member for a vehicle. The second member may include a second frame member for the vehicle. The first frame member and the second frame member may form a closed cross-section by the pair of flange portions of each of the first frame member and the second frame member being joined together The second member may include a reinforcing member that is arranged inside the closed cross-section and is different from the second frame member. The recessed portion of the second frame member may be a first groove that is formed on a joining surface of the flange portions of the second frame member, and extends over substantially an entire length of the second frame member in a longitudinal direction of the second frame member. The recessed portion of the reinforcing member may be a second groove that is formed on an outer surface of the base wall portion of the U-shaped portion of the reinforcing member and extends in a longitudinal direction of the reinforcing member, and does not reach an end on at least one side in the longitudinal direction of the reinforcing member. The welding step may include arranging the reinforcing member inside the U-shaped portion of the second frame member and joining the flange portions of the reinforcing member to an inner surface side of the base wall portion of the U-shaped portion of the second frame member, while one end of the reinforcing member in the longitudinal direction of the reinforcing member is positioned closer than the other end is to a side of a center portion of the second frame member in the longitudinal direction of the second frame member; and bringing the joining surface of the flange portions of the second frame member into contact with the joining surface of the flange portions of the first frame member, and bringing the outer surface of the base wall portion of the U-shaped portion of the reinforcing member into contact with an inner surface of the base wall portion of the U-shaped portion of the first frame member, and welding by pressure and vibration.

According to this structure, in the welding, the joining surface of the flange portions of the second frame member is brought into contact with the joining surface of the flange portions of the first frame member and welded by pressure and vibration. The outer surface of the base wall portion of the U-shaped portion of the reinforcing member is brought into contact with an inner surface of the base wall portion of the U-shaped portion of the first frame member, and welded to the inner surface of the base wall portion of the U-shaped portion of the first frame member by pressure and vibration. Here, the first groove as the recessed portion of the second frame member is formed on the joining surface of the flange portions of the second frame member and extends over substantially the entire length of the second frame member in the longitudinal direction thereof, so the flange portions of the first frame member and the flange portions of the second frame member are able to be stably welded over substantially the entire length in the longitudinal direction thereof. Also, the second groove as the recessed portion of the reinforcing member is formed on the outer surface of the base wall portion of the U-shaped portion of the reinforcing member and extends in the longitudinal direction of the reinforcing member, so the base wall portion of the first frame member and the base wall portion of the reinforcing member are able to be stably welded together.

On the other hand, with this welding, the reinforcing member is arranged inside the closed cross-section, so weld flash produced from the contact portion of the portion of the reinforcing member that is arranged on the side of the center portion in the longitudinal direction inside the closed cross-section, and the facing portion that faces this portion of the reinforcing member, is difficult to remove. Here, the second groove as the recessed portion of the reinforcing member is formed on the outer surface of the base wall portion of the U-shaped portion of the reinforcing member and extends in the longitudinal direction of the reinforcing member, but does not reach an end on at least one side in the longitudinal direction of the reinforcing member. Also, the reinforcing member is vibration welded with the end on one side in the longitudinal direction thereof positioned closer than the end on the other side is to the side of the center portion in the longitudinal direction of the second frame member. Therefore, some of the weld flash produced from the contact portion that is a part of the base wall portion of the U-shaped portion of the reinforcing member that is on one side in the longitudinal direction of the reinforcing member, and the facing portion that faces this portion of the base wall portion, will enter the second groove but not flow out from the second groove.

Therefore, the amount of weld flash produced near the portion of the base wall portion of the reinforcing member on one side in the longitudinal direction of the reinforcing member, and the facing portion that faces this portion of the base wall portion, is reduced, compared to a case in which a groove formed in a base wall portion of a reinforcing member reaches one side in the longitudinal direction of the reinforcing member, such that weld flash is able to flow out of the groove from the one side in the longitudinal direction of the reinforcing member, for example. That is, the amount of weld flash that is produced near a portion of the reinforcing member that is arranged on the side of the center portion in the longitudinal direction in the closed cross-section, and a facing portion that faces this portion of the reinforcing member, in other words, that is produced at a portion where it is difficult to remove weld flash, is able to be reduced.

In the above aspect, the reinforcing member may be provided in a pair, and the welding step may be performed after arranging the reinforcing members on both sides of the U-shaped portion of the second frame member in the longitudinal direction of the second frame member at an inside of the U-shaped portion of the second frame member while end portions on one side in the longitudinal direction of the reinforcing members are facing each other, and joining the flange portions of the reinforcing members to the inner surface side of the base wall portion of the U-shaped portion of the second frame member.

According to this structure, the reinforcing member is provided as a pair and is arranged on both sides in the longitudinal direction inside the closed cross-section. Therefore, weld flash produced from the contact portion of the portion of the base wall portion of the reinforcing member that is on the side where the pair of reinforcing members face each other, and the facing portion that faces this portion of the base wall portion, is even more difficult to remove. Here, the second groove formed on the base wall portion of the reinforcing member does not reach the end of the base wall portion of the reinforcing member on the side where the pair of reinforcing members face each other, so some of the weld flash produced from the contact portion of the portion of the base wall portion of the reinforcing member that is on the side where the pair of reinforcing members face each other, and the facing portion that faces this portion of the base wall portion, enters the second groove and will not flow out from the second groove. Therefore, the amount of weld flash produced at a portion where it is even more difficult to remove weld flash is able to be reduced.

As described above, the manufacturing method for a joined body according to the aspect of the disclosure enables weld quality to be more stably ensured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
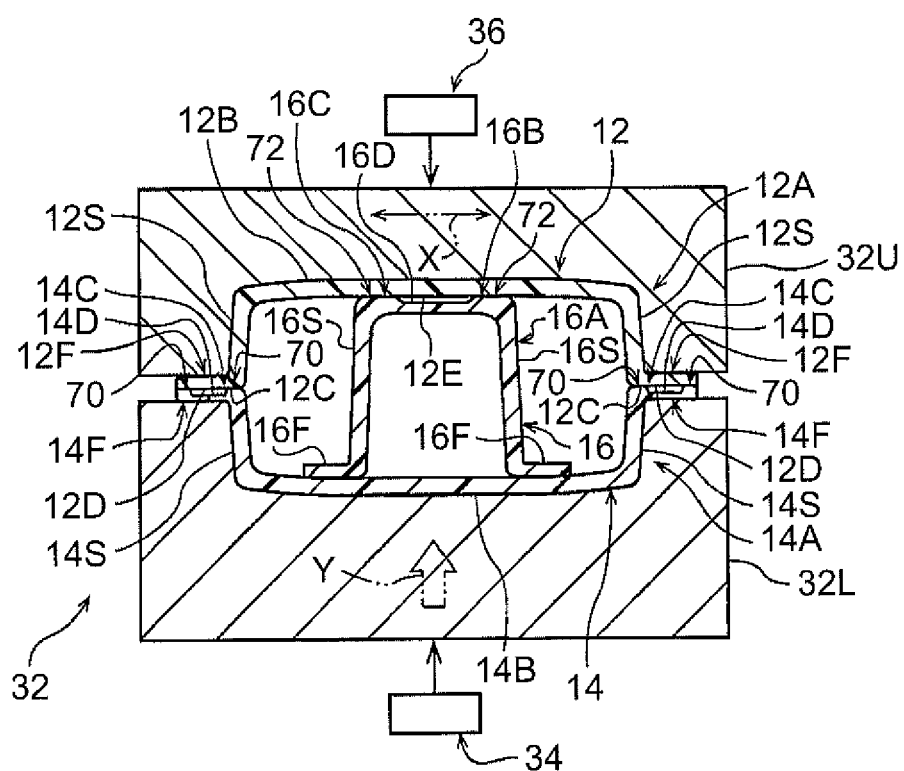
FIG. 1 is a sectional view showing a frame format of a vibration welding process in a manufacturing method for a bumper reinforcement (a joined body) according to one example embodiment of the disclosure.
Figure 2:
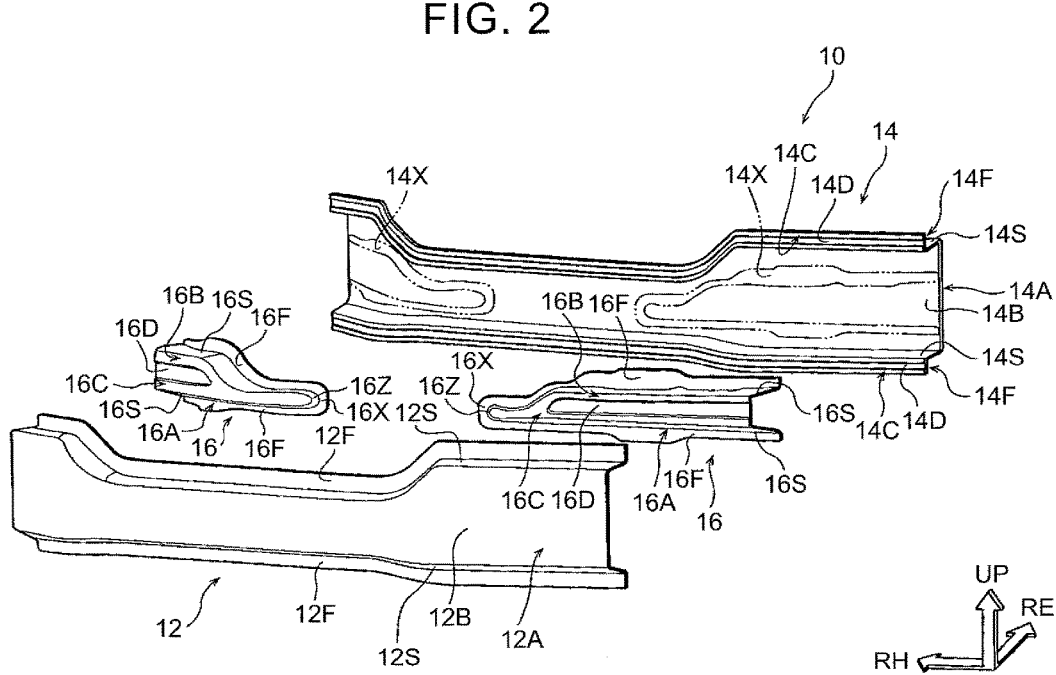
FIG. 2 is an exploded perspective view of constituent members of the bumper reinforcement that is the joining object shown in FIG. 1.

A manufacturing method for a vehicle bumper reinforcement as a joined body according to one example embodiment of the disclosure will now be described with reference to FIGS. 1 to 7B. FIG. 1 is a sectional view showing a frame format of welding (hereinafter, referred to as a "vibration welding process") in the manufacturing method for the bumper reinforcement according to this example embodiment. Also, FIG. 2 is an exploded perspective view of constituent members of the bumper reinforcement 10 (hereinafter, abbreviated to "bumper RF 10"). First, the constituent members of this bumper RF 10 will be briefly described. The arrow RE shown in FIG. 2 indicates the rear side in the vehicle front-rear direction, the arrow UP indicates upward in the vehicle up and down direction, and the arrow RH indicates the right side in the vehicle width direction. Also, the bumper RF 10 is a frame structure of a front bumper, not shown, provided on a front end portion of a vehicle, and is formed in a hollow shape and is arranged with the vehicle width direction as the longitudinal direction.

(Structure of the Bumper RF 10)

As shown in FIG. 2, the bumper RF 10 includes a vehicle front-side bumper reinforcement 12 (hereinafter simply referred to as a "front-side bumper RF 12") as a "first member", and as a "first frame member", that forms a vehicle front-side portion of the bumper RF 10, and a vehicle rear-side bumper reinforcement 14 (hereinafter simply referred to as a "rear-side bumper RF 14") as a "second member", and as a "second frame member", that forms a vehicle rear-side portion of the bumper RF 10. The front-side bumper RF 12 and the rear-side bumper RF 14 are both formed in a elongated shape having a longitudinal direction, and are arranged with the vehicle width direction as the longitudinal direction.

The front-side bumper RF 12 has a shape in a sectional view orthogonal to the longitudinal direction thereof, that is hat-shaped over the entire region in the longitudinal direction, and includes a pair of flange portions 12F and a U-shaped portion 12A with a U-shaped cross-section. The U-shaped portion 12A of the front-side bumper RF 12 has a U-shape that is arranged protruding toward the front side in the vehicle front-rear direction and opening toward the rear side in the vehicle front-rear direction when viewed from the longitudinal direction thereof, and is formed by a base wall portion 12B and a pair of facing wall portions 12S. The base wall portion 12B connects base ends of the pair of facing wall portions 12S together, and is arranged as a portion on the front side in the vehicle front-rear direction of the U-shaped portion 12A, and forms a front wall portion of the bumper RF 10. Also, the pair of flange portions 12F of the front-side bumper RF 12 are set on both end portions of the shape in the sectional view orthogonal to the longitudinal direction of the front-side bumper RF 12, and extend in directions away from each other from an open end of the U-shaped portion 12A when viewed from the longitudinal direction of the front-side bumper RF 12.

The rear-side bumper RF 14 has a shape in a sectional view orthogonal to the longitudinal direction thereof, that is hat-shaped over the entire region in the longitudinal direction, and includes a pair of flange portions 14F and a U-shaped portion 14A with a U-shaped cross-section. The U-shaped portion 14A of the rear-side bumper RF 14 has a U-shape that is arranged protruding toward the rear side in the vehicle front-rear direction and opening toward the front side in the vehicle front-rear direction when viewed from the longitudinal direction thereof, and is formed by a base wall portion 14B and a pair of facing wall portions 14S. The base wall portion 14B connects base ends of the pair of facing wall portions 14S together, and is arranged as a portion on the rear side in the vehicle front-rear direction of the U-shaped portion 14A, and forms a rear wall portion of the bumper RF 10. Also, the pair of flange portions 14F of the rear-side bumper RF 14 are set on both end portions of the shape in the sectional view orthogonal to the longitudinal direction of the rear-side bumper RF 14, and extend in directions away from each other from an open end of the U-shaped portion 14A when viewed from the longitudinal direction of the rear-side bumper RF 14. In the description below, portions such as the flange portions 14F and the like that are provided in plurality may be described in the singular to simplify the description and facilitate understanding.

Also, a first groove 14D as a recessed portion is formed on a joining surface 14C (a surface facing toward the front side in the vehicle front-rear direction) of the flange portion 14F of the rear-side bumper RF 14 that is to be joined to the flange portion 12F of the front-side bumper RF 12. This first groove 14D extends over the entire length of the flange portion 14F in the longitudinal direction of the rear-side bumper RF 14, and is set in a middle portion (a portion between a base end portion and a tip end portion) of the joining surface 14C of the flange portion 14F of the rear-side bumper RF 14 in a sectional view orthogonal to the longitudinal direction of the rear-side bumper RF 14, A pair of side wall portions of the first groove 14D are inclined so as to come closer together toward the groove bottom side (see FIG. 1). Also, in this example embodiment, the first groove 14D reaches both ends in the longitudinal direction of the rear-side bumper RF 14. Moreover, at the joining surface 14C of the flange portion 14F of the rear-side bumper RF 14, the area of the portion where the first groove 14D is formed is set smaller than the area of the portion where the first groove 14D is not formed.

The flange portion 12F of the front-side bumper RF 12 and the flange portion 14F of the rear-side bumper RF 14 are arranged facing each other in the plate thickness direction and welded (joined) together. As a result, a closed cross-section 18 that extends in the longitudinal direction of the bumper RF 10 (the front-side bumper RF 12 and the rear-side bumper RF 14) is formed by the front-side bumper RF 12 and the rear-side bumper RF 14, as shown in FIG. 6.

Figure 6:
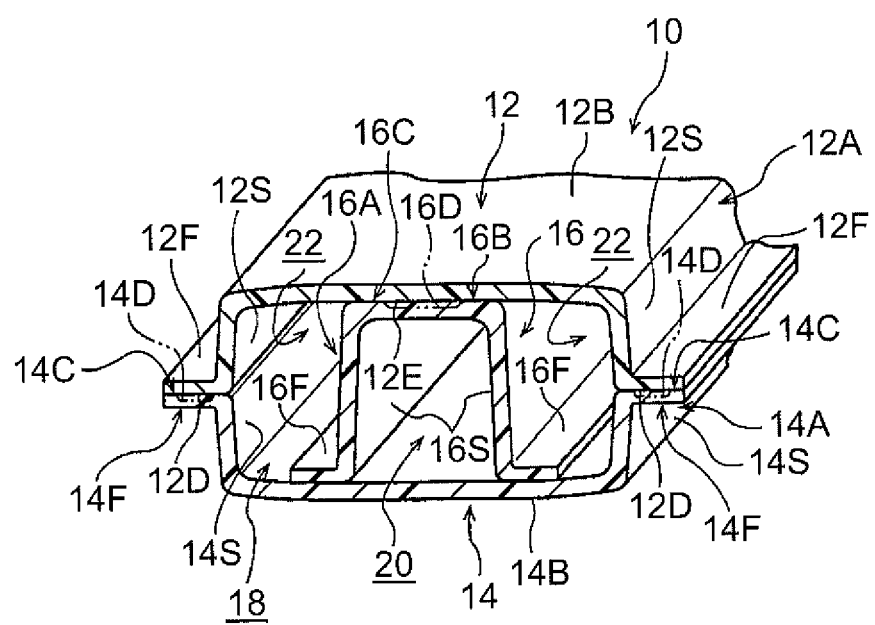
FIG. 6 is a broken perspective view of a portion of the bumper reinforcement that has been welded by the vibration welding process illustrated in FIG. 1.

Also, a pair of left and right bulkheads 16 as a different "second member" that differs from the rear-side bumper RF 14, and as a reinforcing member, is arranged on the bumper RF 10 shown in FIGS. 2 and 6, as reinforcement for the bumper RF 10 on both sides in the longitudinal direction inside the closed cross-section 18 thereof (see FIG. 6). As shown in FIG. 2, the bulkheads 16 are each formed in a elongated shape and are arranged with the vehicle width direction as the longitudinal direction.

The bulkhead 16 has a shape in a sectional view orthogonal to the longitudinal direction thereof that is hat-shaped, and includes a pair of flange portions 16F and a U-shaped portion 16A with a U-shaped cross-section, except for an end portion arranged on the inside in the vehicle width direction. The U-shaped portion 16A of the bulkhead 16 has a U-shape that is arranged protruding toward the front side in the vehicle front-rear direction and opening toward the rear side in the vehicle front-rear direction when viewed from the longitudinal direction thereof, and is formed by a base wall portion 16B and a pair of facing wall portions 16S.

The base wall portion 16B connects base ends of the pair of facing wall portions 16S together, and forms a portion of the U-shaped portion 16A that is arranged on the front side in the vehicle front-rear direction. The dimension in the vehicle up and down direction of a portion of the bulkhead 16 that is arranged on the inside in the vehicle width direction, when the bulkhead 16 is in the arranged state, is shorter (narrower) than that of a portion of the bulkhead 16 that is arranged on the outside in the vehicle width direction. Also, the pair of flange portions 16F of the bulkhead 16 are set on both end portions of the shape in the sectional view orthogonal to the longitudinal direction of the bulkhead 16, and extend in directions away from each other from the open end of the U-shaped portion 16A when viewed from the side arranged on the outside in the vehicle width direction of the bulkhead 16. Also, the bulkhead 16 is closed off by end portions that are arranged on the inside in the vehicle width direction of the U-shaped portion 16A being connected together by a closed-off portion 16Z, and the end portions of the pair of flange portions 16F that are arranged on the inside in the vehicle width direction are connected together by an end flange portion 16X that is connected to the closed-off portion 16Z.

Also, a second groove 16D as a recessed portion is formed on a joining surface 16C (a surface facing toward the front side in the vehicle front-rear direction) of the base wall portion 16B of the bulkhead 16 that is to be joined to the base wall portion 12B of the front-side bumper RF 12. The second groove 16D is formed on an outer surface (on the side arranged on the front side in the vehicle front-rear direction) of the base wall portion 16B of the U-shaped portion 16A. The second groove 16D is set in a middle portion between an upper end portion and a lower end portion of the base wall portion 16B of the bulkhead 16, and extends in the longitudinal direction of the bulkhead 16. A pair of side wall portions of the second groove 16D are inclined so as to come closer together toward the groove bottom side (see FIG. 1).

Also, in this example embodiment, the second groove 16D does not reach the end of the base wall portion 16B of the bulkhead 16 on the side arranged on the inside in the vehicle width direction (i.e., on one side in the longitudinal direction of the bulkhead 16), but does reach the end of the base wall portion 16B of the bulkhead 16 on the side arranged on the outside in the vehicle width direction (i.e., on the other side in the longitudinal direction of the bulkhead 16). Moreover, at the joining surface 16C of the base wall portion 16B of the bulkhead 16, the area of the portion where the second groove 16D is formed is set smaller than the area of the portion where the second groove 16D is not formed.

The joining surface side of the flange portions 16F of the bulkhead 16 and the inner surface side of the base wall portion 14B of the U-shaped portion 14A of the rear-side bumper RF 14 are arranged facing each other, and are joined together by welding. In FIG. 2, the portion where the flange portions 16F of the bulkhead 16 are planned to be joined to the inner surface side of the base wall portion 14B of the U-shaped portion 14A of the rear-side bumper RF 14 is indicated by the alternate long and two short dashes lines 14X. The outer surface side of the base wall portion 16B of the U-shaped portion 16A of the bulkhead 16 and the inner surface side of the base wall portion 12B of the U-shaped portion 12A of the front-side bumper RF 12 are arranged facing each other, and are joined together by welding. As a result, as shown in FIG. 6, a closed cross-section 20 is formed by the rear-side bumper RF 14 and the bulkhead 16, and a closed cross-section 22 is formed by the front-side bumper RF 12 and the rear-side bumper RF 14 and the bulkhead 16, inside the closed cross-section 18.

Also, in this example embodiment, the front-side bumper RF 12, the rear-side bumper RF 14, and the bulkhead 16 are each made of thermoplastic resin material. More specifically, the front-side bumper RF 12, the rear-side bumper RF 14, and the bulkhead 16 are each made of carbon fiber reinforced thermoplastic resin material that includes carbon fibers as the reinforcing fibers. Carbon fiber reinforced thermoplastic resin material is preferable as the material of the bumper RF 10 because it has high strength and is lighter than metal material, for example. Also, continuous fibers, as well as long fibers and short fibers, for example, be may be applied as the reinforcing fibers. Any of a variety of well-known types of thermoplastic resin can be used for the thermoplastic resin used for the carbon fiber reinforced thermoplastic resin material. Some examples of the thermoplastic resin used in this example embodiment are polycarbonate resin, polyamide (PA) resin, polyurethane (PU) resin, polyvinyl chloride resin, acrylonitrile-butadiene-styrene copolymer (ABS) resin, and polypropylene (PP) resin and the like. Also, any of a variety of well-known types of fibers, such as metal fibers, glass fibers, or resin fibers such as aramid fibers, cellulose fibers, nylon fibers, vinylon fibers, polyester fibers, polyolefin fibers, and rayon fibers or the like, may be used, instead of carbon fibers, for the reinforcing fibers included in the thermoplastic resin material.

(Vibration Welding Machine 30)

Figure 3:
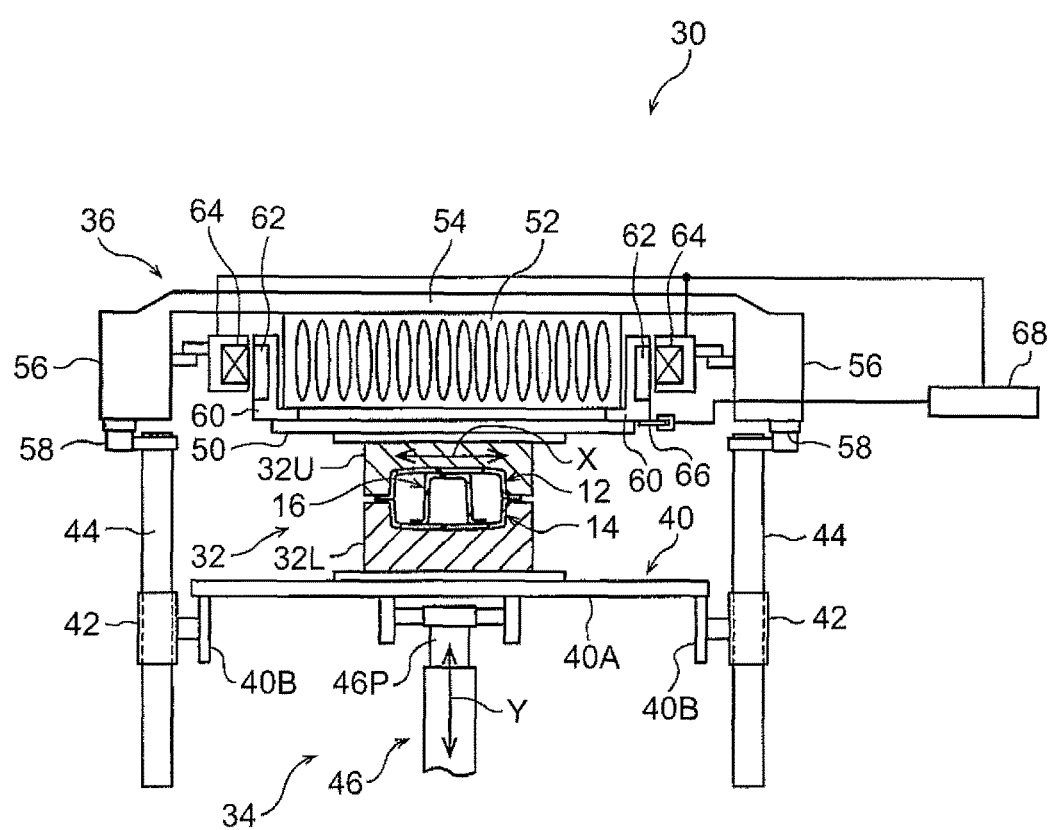
FIG. 3 is a block diagram schematically showing the main portions of a vibration welding machine used in the vibration welding process illustrated in FIG. 1.

Next, the vibration welding machine 30 that vibration welds the constituent members of the bumper RF 10 together will be briefly described. FIG. 3 is a block diagram schematically showing the main portions of the vibration welding machine 30 used in the vibration welding process illustrated in FIG. 1. The vibration welding process illustrated in FIG. 1 may be performed using any well-known vibration welding machine.

As shown in FIG. 3, the vibration welding machine 30 includes a vibration welding jig 32, a pressing device 34, and a vibrating device 36. The vibration welding jig 32 includes an upper jig 32U that forms an upper side, and a lower jig 32L that forms a lower side. The upper jig 32U and the lower jig 32L form a die that is made of metal (an aluminum alloy in one example) in this example embodiment. The front-side bumper RF 12 is placed in the upper jig 32U shown in FIG. 3, and the rear-side bumper RF 14 is placed in the lower jig 32L. The upper jig 32U and the lower jig 32L are able to be replaced according to the object to be welded. For example, an upper jig 32A (see FIG. 4A) is installed instead of the upper jig 32U when placing the bulkhead 16 on the upper side. Also, a non-slip sheet, not shown, as an example is preferably applied to the placement surface of the upper jig 32U and 32A (see FIG. 4A) and the lower jig 32L.

The pressing device 34 shown on the lower side in the drawing includes a lift table 40 below the lower jig 32L, and the lower surface side of the lower jig 32L is fixed to a support plate portion 40A of this lift table 40. Also, cylindrical holders 42 are mounted to leg portions 40B on both sides of the lift table 40 via connecting portions. The pair of left and right holders 42 is able to move in the up and down direction of the device along guide shafts 44 that extend in the up and down direction of the device. Also, the support plate portion 40A of the lift table 40 is connected to a tip end portion of a piston 46P of a hydraulic cylinder 46 provided on the lower side of this device, so as to be raised and lowered in the up and down direction of the device (see the direction of arrow Y) by the expansion and contraction of the piston 46P of the hydraulic cylinder 46. That is, the lower jig 32L is able to apply pressure to the side with the upper jig 32U by the pressing device 34 being operated to raise the lift table 40 upward in the up and down direction of the device.

Also, the vibrating device 36 shown on the upper side in the drawing includes a vibration plate 50 that contacts the upper surface side of the upper jig 32U. This vibration plate 50 hangs down from a top plate portion 54 via a leaf spring 52, and is able to vibrate in the horizontal direction (see the direction of arrow X). Hanging portions 56 that hang downward in the up and down direction of the device from both the left and right sides of the top plate portion 54 are provided, and these hanging portions 56 are mounted to upper end portions of the guide shafts 44 via damper mounts 58 and the like. Also, magnetic members 62 are mounted via brackets 60 to both sides of the vibration plate 50. The pair of left and right magnetic members 62 are arranged next to the sides of the leaf spring 52. Also, electromagnetic coils 64 are arranged on the sides opposite the sides where the vibration plate 50 is provided, with respect to the magnetic members 62. A power supply 68 is electrically connected to the pair of left and right electromagnetic coils 64, and high-frequency current is supplied to the pair of left and right electromagnetic coils 64 from the power supply 68. That is, the upper jig 32U vibrates together with the magnetic members 62 and the vibration plate 50, when the vibrating device 36 is operated and the magnetic members 62 vibrate to the left and right by the magnetic force generated by the electromagnetic coils 64.

Also, a pickup sensor 66 capable of detecting the vibration frequency of the vibration plate 50 is provided next to a side of the vibration plate 50. The pickup sensor 66 is electrically connected to the power supply 68, and supplies a detection signal to the power supply 68. Also, the power supply 68 vibrates the vibration plate 50 at a desired vibration frequency in the horizontal direction by adjusting the high-frequency current supplied to the electromagnetic coils 64 based on the detection signal.

(Manufacturing Method for the Bumper RF 10)

Next, a manufacturing method for the bumper RF 10 shown in FIG. 6 will be described.

In this example embodiment, the rear-side bumper RF 14 and the bulkhead 16 are vibration welded first before the front-side bumper RF 12 as the "first member" shown in FIG. 1, and the rear-side bumper RF 14 and the bulkhead 16 as the "second members" are vibration welded.

Figure 4A:
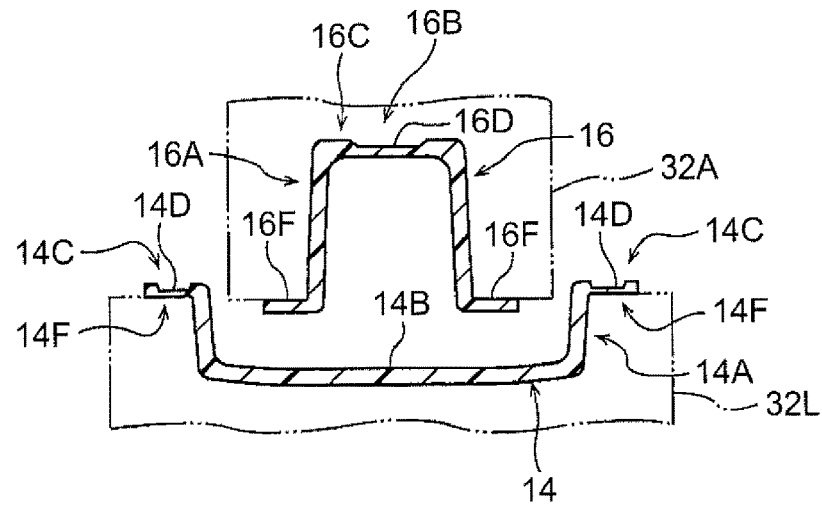
FIG. 4A is a sectional view of a state in which flange portions of a bulkhead are positioned inside a U-shaped portion of a rear-side bumper reinforcement, in a joining procedure for joining together the constituent members of the bumper reinforcement that is the joining object shown in FIG. 1.
Figure 4B:
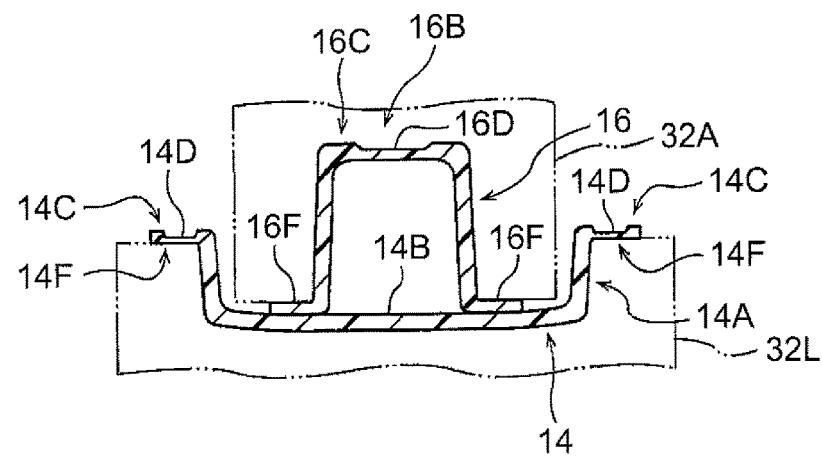
FIG. 4B is a sectional view of a state in which the flange portions of the bulkhead are contacting a base wall portion of the rear-side bumper reinforcement, in the joining procedure for joining together the constituent members of the bumper reinforcement that is the joining object shown in FIG. 1.

The rear-side bumper RF 14 shown in FIG. 4A is placed in the lower jig 32L, and the bulkhead 16 is placed in the upper jig 32A. Then, the bulkhead 16 is arranged on both sides in the longitudinal direction of the rear-side bumper RF 14, with the ends of the pair of bulkheads 16 that are on the sides with the closed-off portions 16Z facing each other (that is, with the ends of the bulkhead 16 on the sides with the closed-off portions 16Z positioned closer than the ends on the opposite sides are to the side of the center portion in the longitudinal direction of the rear-side bumper RF 14). Then, as shown in FIGS. 4A and 4B, the flange portions 16F of the bulkhead 16 are positioned inside the U-shaped portion 14A of the rear-side bumper RF 14, and the flange portions 16F of the bulkhead 16 are brought into contact with the base wall portion 14B of the rear-side bumper RF 14 (see FIG. 4B). At this time, the pair of bulkheads 16 are arranged on both sides in the longitudinal direction inside the U-shaped portion 14A of the rear-side bumper RF 14. In this state, the inner surface side of the base wall portion 14B of the U-shaped portion 14A of the rear-side bumper RF 14 shown in FIG. 4B is welded (joined), by pressure and vibration, to the joining surface side of the flange portions 16F of the bulkhead 16, using the pressing device 34 and the vibrating device 36 of the vibration welding machine 30 shown in FIG. 3. The end flange portions 16X (see FIG. 2) of the bulkheads 16 are also welded (joined) to the base wall portion 14B of the rear-side bumper RF 14 by the pressure and vibration at this time.

Figure 4C:
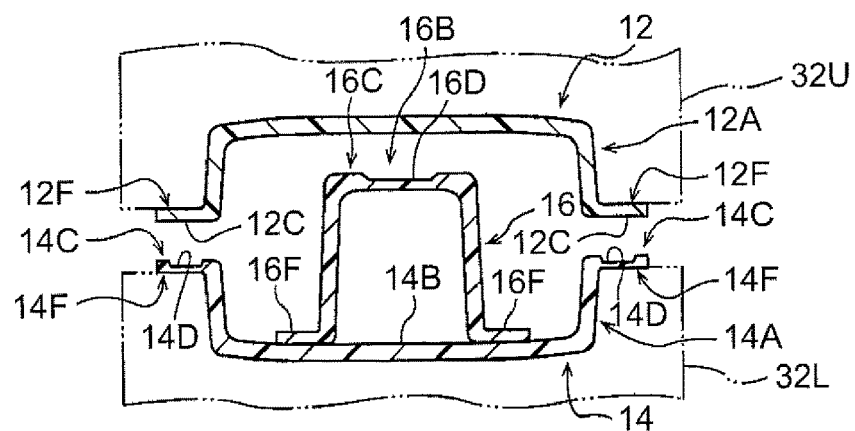
FIG. 4C is a sectional view of a state in which flange portions of the rear-side bumper reinforcement are arranged facing flange portions of a front-side bumper reinforcement, in the joining procedure for joining together the constituent members of the bumper reinforcement that is the joining object shown in FIG. 1.

Next, the hold on the bulkhead 16 by the upper jig 32A is released, and the front-side bumper RF 12 is placed in the upper jig 32U, and the joining surface 14C of the flange portions 14F of the rear-side bumper RF 14 are arranged facing a joining surface 12C of the flange portions 12F of the front-side bumper RF 12, as shown in FIG. 4C. Also, the bulkhead 16 is arranged on both sides in the longitudinal direction inside the U-shaped portion 12A of the front-side bumper RF 12. Then, as shown in FIG. 1, the joining surface 14C of the flange portions 14F of the rear-side bumper RF 14 is brought into contact with the joining surface 12C of the flange portions 12F of the front-side bumper RF 12, and the outer surface of the base wall portion 16B of the U-shaped portion 16A of the bulkhead 16 is brought into contact with the inner surface of the base wall portion 12B of the U-shaped portion 12A of the front-side bumper RF 12. More specifically, the portion of the joining surface 14C of the flange portions 14F of the rear-side bumper RF 14, excluding the first groove 14D, is brought into contact with the flange portions 12F of the front-side bumper RF 12, and the portion of the joining surface 16C of the base wall portion 16B of the bulkhead 16, excluding the second groove 16D, is brought into contact with the base wall portion 12B of the front-side bumper RF 12.

In this state, the flange portions 14F of the rear-side bumper RF 14 are welded to the flange portions 12F of the front-side bumper RF 12, and the base wall portion 16B of the bulkhead 16 is welded to the base wall portion 12B of the front-side bumper RF 12, by pressure (see the direction of arrow Y) and vibration (see the direction of arrow X), using the pressing device 34 and the vibrating device 36 of the vibration welding machine 30 (see FIG. 3) (vibration welding process).

Here, in this example embodiment, the area (contact area) of a contact portion 70 of the flange portions 12F of the front-side bumper RF 12 and the flange portions 14F of the rear-side bumper RF 14 is able to be reduced, by the amount of the first groove 14D formed on the flange portions 14F of the rear-side bumper RF 14. At the same time, reaction force (force in the direction opposite the pressing direction) due to weld flash produced at the contact portion 70 at the time of vibration welding is able to be reduced, by the first groove 14D formed on the flange portions 14F of the rear-side bumper RF 14. Therefore, the flange portions 12F of the front-side bumper RF 12 and the flange portions 14F of the rear-side bumper RF 14 are able to be placed in a desired pressure-contact state with little pressure, compared to a comparative example in which the first groove 14D is not formed on the flange portions 14F of the rear-side bumper RF 14.

Similarly, the area (contact area) of a contact portion 72 of the base wall portion 12B of the front-side bumper RF 12 and the base wall portion 16B of the bulkhead 16 is able to be reduced, by the amount of the second groove 16D formed on the base wall portion 16B of the bulkhead 16. At the same time, reaction force (force in the direction opposite the pressing direction) due to weld flash produced at the contact portion 72 at the time of pressing is able to be reduced, by the second groove 16D formed on the base wall portion 16B of the bulkhead 16. Therefore, the base wall portion 12B of the front-side bumper RF 12 and the base wall portion 16B of the bulkhead 16 are able to be placed in a desired pressure-contact state with little pressure, compared to a comparative example in which the second groove 16D is not formed on the base wall portion 16B of the bulkhead 16.

The vibration welding process will now be described in more detail. In the vibration welding process, first, the contact portions 70 and 72 are melted and welded by generating frictional heat by vibration in the contact portion 70 of the flange portions 14F of the rear-side bumper RF 14 and the flange portions 12F of the front-side bumper RF 12, and the contact portion 72 of the base wall portion 16B of the bulkhead 16 and the base wall portion 12B of the front-side bumper RF 12.

Figure 5A:
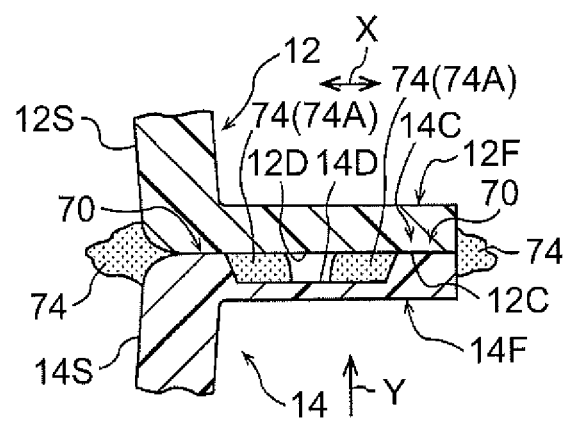
FIG. 5A is a sectional view of a state of a contact portion of the front-side bumper reinforcement and the rear-side bumper reinforcement, and a portion therearound, in the vibration welding process.

Also, in this vibration welding process, the first groove 14D and a facing portion 12D that faces the first groove 14D are welded together, as shown in FIG. 6, by introducing some weld flash 74 produced from the contact portion 70 into the first groove 14D, as shown in FIG. 5A, and melting the first groove 14D and the facing portion 12D, and the weld flash 74 (74A) in the first groove 14D, with heat transferred from the contact portion 70 to the first groove 14D and the facing portion 12D. As a result, not only the contact portion 70, but also the first groove 14D and the facing portion 12D, is able to be welded, so weld quality is able to be ensured even if the dimensional accuracy of the portions to be joined is not high.

Figure 5B:
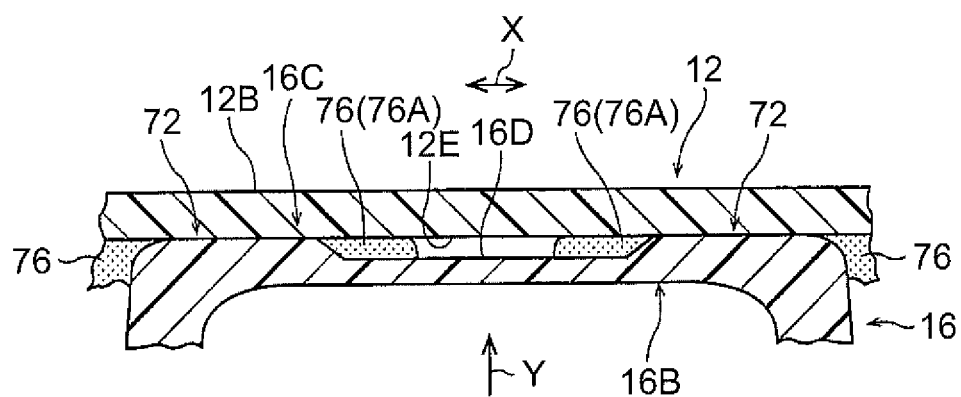
FIG. 5B is a sectional view of the contact portion of the front-side bumper reinforcement and the bulkhead, and a portion therearound, in the vibration welding process.

Also, in the vibration welding process, the second groove 16D and a facing portion 12E that faces the second groove 16D are welded together, as shown in FIG. 6, by introducing some weld flash 76 produced from the contact portion 72 into the second groove 16D, as shown in FIG. 5B, and melting the second groove 16D and the facing portion 12E, and the weld flash 76 (76A) in the second groove 16D, with heat transferred from the contact portion 72 to the second groove 16D and the facing portion 12E. As a result, not only the contact portion 72, but also the second groove 16D and the facing portion 12E, is able to be welded, so weld quality is able to be ensured even if the dimensional accuracy of the portions to be joined is not high. In FIG. 6, the portions of the first groove 14D and the second groove 16D before vibration welding are indicated by alternate long and two short dashes lines.

To elaborate, the dimensional accuracy of the portions to be joined tends to decrease when the number of members (components) to be joined or large members (components) such as vehicle frame members (e.g., the front-side bumper RF 12 and the rear-side bumper RF 14) is large, for example. However, with this example embodiment, weld quality is able to be ensured as described above, even if the dimensional accuracy of portions to be joined is not high.

Also, in this example embodiment, the first groove 14D is set to a middle portion of the joining surface 14C of the flange portions 14F of the rear-side bumper RF 14 in a sectional view orthogonal to the longitudinal direction of the rear-side bumper RF 14, as shown in FIG. 1. Therefore, in the vibration welding process, both end portions of the joining surface 14C of the flange portions 14F of the rear-side bumper RF 14 in a sectional view orthogonal to the longitudinal direction of the rear-side bumper RF 14 are able to be brought into contact with the joining surface 12C of the flange portions 12F of the front-side bumper RF 12, even if excessive pressure is not applied. Therefore, pressure is able to be stably applied to the flange portions 14F of the rear-side bumper RF 14, so the flange portions 14F of the rear-side bumper RF 14 are able to be stably welded to the flange portions 12F of the front-side bumper RF 12.

Also, in this example embodiment, the first groove 14D extends over the entire length of the rear-side bumper RF 14 in the longitudinal direction thereof, so the flange portions 14F of the rear-side bumper RF 14 are able to be stably welded over the entire length in the longitudinal direction thereof, compared to a structure in which a plurality of recessed portions are scattered about on flange portions of a rear-side bumper RF, for example.

Also, in this example embodiment, the second groove 16D formed on the base wall portion 16B of the bulkhead 16 extends in the longitudinal direction of the bulkhead 16, but does not reach the end of the base wall portion 16B of the bulkhead 16 on the side with the closed-off portion 16Z, as shown in FIG. 2. Also, the bulkhead 16 is vibration welded in a state with the end on the side with the closed-off portion 16Z positioned closer than the end on the opposite side is to the side of the center portion in the longitudinal direction of the rear-side bumper RF 14.

Therefore, some of the weld flash 76 (see FIG. 5B) produced from the contact portion of the portion of the base wall portion 16B of the bulkhead 16 on the side with the closed-off portion 16Z and the base wall portion 12B of the front-side bumper RF 12 enters the second groove 16D and will not flow out from the second groove 16D. Consequently, the amount of weld flash produced near the portion of the base wall portion 16B of the bulkhead 16 on the side with the closed-off portion 16Z and the facing portion that faces that portion of the base wall portion 16B is reduced compared to a case in which a second groove formed on a base wall portion 16B of a bulkhead 16 reaches the end of the bulkhead 16 on the side with a closed-off portion 16Z, such that weld flash is able to flow out of the second groove from that end portion side of the bulkhead 16. That is, the amount of weld flash that is produced near a portion of the base wall portion 16B of the bulkhead 16 that is arranged on the side of the center portion in the longitudinal direction inside the closed cross-section 18, and a facing portion that faces this portion of the base wall portion 16B, in other words, that is produced at a portion where it is difficult to remove weld flash, is able to be reduced.

In particular, with this example embodiment, the bulkhead 16 is provided as a pair and is arranged on both sides in the longitudinal direction inside the closed cross-section 18 (see FIG. 6). Therefore, weld flash produced from the contact portion of the portion of the base wall portion 16B of the bulkhead 16 that is on the side where the pair of bulkheads 16 face each other, and the facing portion that faces this portion of the base wall portion 16B, is even more difficult to remove. However, in this example embodiment, the second groove 16D formed on the base wall portion 16B of the bulkhead 16 does not reach the end of the base wall portion 16B on the side where the pair of bulkheads 16 face each other, so some of the weld flash produced from the contact portion of the portion of the base wall portion 16B that is on the side where the pair of bulkheads 16 face each other, and the facing portion that faces this portion of the base wall portion 16B (i.e., the base wall portion 12B of the front-side bumper RF 12), enters the second groove 16D and will not flow out from the second groove 16D. Therefore, the amount of weld flash produced at a portion where it is even more difficult to remove weld flash is able to be reduced.

The second groove 16D formed on the base wall portion 16B of the bulkhead 16 reaches the end of the bulkhead 16 on the side opposite the side with the closed-off portion 16Z, so some of the weld flash that is produced from the contact portion of the portion of the base wall portion 16B of the U-shaped portion 16A of the bulkhead 16 that is on the side opposite the side with the closed-off portion 16Z of the bulkhead 16, and the facing portion that faces this portion of the base wall portion 16B, is able to flow out from the end side of the second groove 16D after entering the second groove 16D. However, the end of the base wall portion 16B of the bulkhead 16 that is on the side opposite the side with the closed-off portion 16Z is positioned closer than the end on the side with the closed-off portion 16Z is to the end portion side in the longitudinal direction of the rear-side bumper RF 14, so even if weld flash is produced on the end of the bulkhead 16 that is on the side opposite the side with the closed-off portion 16Z, this weld flash is able to be relatively easily removed.

Further, the first groove 14D of the rear-side bumper RF 14 is formed on the joining surface 14C of the flange portions 14F of the rear-side bumper RF 14, and extends in the longitudinal direction of the rear-side bumper RF 14, and reaches both ends in the longitudinal direction of the rear-side bumper RF 14, so some of the weld flash that has entered the first groove 14D is able to flow out from the end side in the longitudinal direction of the second groove 16D. However, this weld flash is only produced on the outside of the joined body of the front-side bumper RF 12 and the rear-side bumper RF 14, and is thus able to be easily removed.

The bumper RF 10 shown in FIG. 6 is manufactured by the front-side bumper RF 12, the rear-side bumper RF 14, and the bulkhead 16 being joined together via the vibration welding process described above.

When some of the weld flash 74 shown in FIG. 5A flows into the first groove 14D, reinforcing fibers in the weld flash 74 flow into the first groove 14D while being vibrated, so it is surmised that these reinforcing fibers will tend to become entangled with each other due to the agitating action at the weld zone in the first groove 14D and the portion adjacent thereto. Similarly, when some of the weld flash 76 shown in FIG. 5B flows into the second groove 16D, reinforcing fibers in the weld flash 76 flow into the second groove 16D while being vibrated, so it is surmised that these reinforcing fibers will tend to become entangled with each other due to the agitating action at the weld zone in the second groove 16D and the portion adjacent thereto.

Figure 7A:
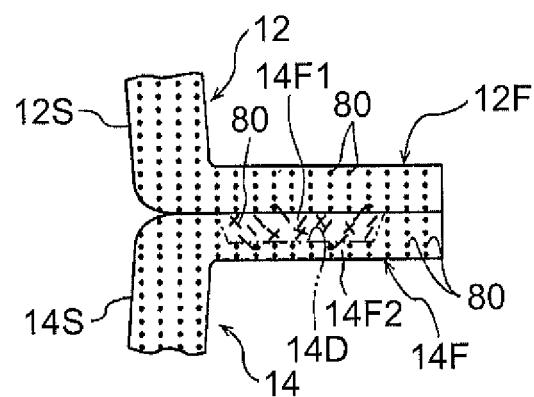
FIG. 7A is a sectional view showing a frame format of the arrangement of reinforcing fibers when observing a cross-section of an overlapping portion of the flange portion of the front-side bumper reinforcement and the flange portion of the rear-side bumper reinforcement that have been welded by the vibration welding process, cut in the overlapping direction thereof.

FIG. 7A is a sectional view showing a frame format of the arrangement of reinforcing fibers 80 when observing a cross-section of an overlapping portion of the flange portion 12F of the front-side bumper RF 12 and the flange portion 14F of the rear-side bumper RF 14 that have been welded (joined) by the vibration welding process, cut in the overlapping direction thereof.

As shown in FIG. 7A, at the flange portion 12F of the front-side bumper RF 12, the reinforcing fibers 80 are oriented in a direction orthogonal to the overlapping direction of the flange portion 12F of the front-side bumper RF 12 and the flange portion 14F of the rear-side bumper RF 14

(i.e., in a direction perpendicular to the surface of the paper on which FIG. 7A is drawn, as an example). Also, in the flange portion 14F of the rear-side bumper RF 14, there is a first region 14F1 that forms a portion on the side with the flange portion 12F of the front-side bumper RF 12 and corresponds to the inside of the first groove 14D before vibration welding, and a second region 14F2 that forms a portion other than the first region 14F1. At the first region 14F1, the reinforcing fibers 80 are randomly oriented, and some of the plurality of reinforcing fibers 80 are entangled with each other. Also, at the second region 14F2, the reinforcing fibers 80 are oriented in a direction orthogonal to the overlapping direction of the flange portion 12F of the front-side bumper RF 12 and the flange portion 14F of the rear-side bumper RF 14 (i.e., in a direction perpendicular to the surface of the paper on which FIG. 7A is drawn, as an example).

At a portion of the flange portion 14F of the rear-side bumper RF 14 that is near a boundary portion of the first region 14F1 and the second region 14F2, some of the plurality of reinforcing fibers 80 in the first region 14F1 and some of the plurality reinforcing fibers 80 in the second region 14F2 are entangled with each other. Moreover, at a portion near a boundary portion of the first region 14F1 of the flange portion 14F of the rear-side bumper RF 14 and the flange portion 12F of the front-side bumper RF 12, some of the plurality of reinforcing fibers 80 in the first region 14F1 of the flange portion 14F of the rear-side bumper RF 14 and some of the plurality of reinforcing fibers 80 in the flange portion 12F of the front-side bumper RF 12 are entangled with each other.

This resultant entanglement of the reinforcing fibers 80 improves the weld strength (joint strength) of the flange portion 12F of the front-side bumper RF 12 and the flange portion 14F of the rear-side bumper RF 14.

Figure 7B:
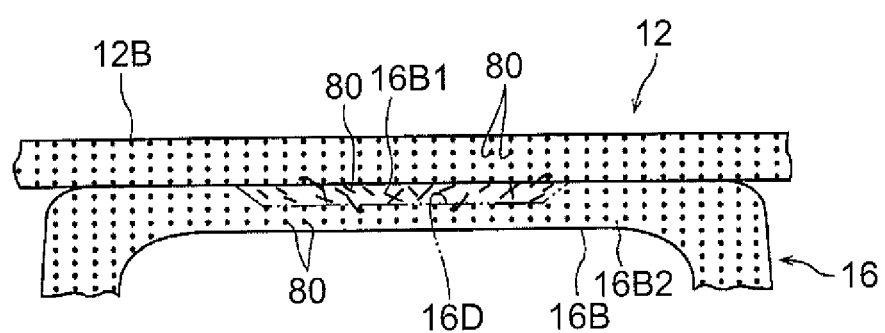
FIG. 7B is a sectional view showing a frame format of the arrangement of the reinforcing fibers when observing a cross-section of an overlapping portion of the base wall portion of the front-side bumper reinforcement and the base wall portion of the bulkhead that have been welded by the vibration welding process, cut in the overlapping direction thereof.

Also, FIG. 7B is a sectional view showing a frame format of the arrangement of the reinforcing fibers 80 when observing a cross-section of an overlapping portion of the base wall portion 12B of the front-side bumper RF 12 and the base wall portion 16B of the bulkhead 16 that have been welded (joined) by the vibration welding process, cut in the overlapping direction thereof.

As shown in FIG. 7B, at the base wall portion 12B of the front-side bumper RF 12, the reinforcing fibers 80 are oriented in a direction orthogonal to the overlapping direction of the base wall portion 12B of the front-side bumper RF 12 and the base wall portion 16B of the bulkhead 16 (i.e., in a direction perpendicular to the surface of the paper on which FIG. 7B is drawn, as an example). Also, on the base wall portion 16B of the bulkhead 16, there is a first region 16B1 that forms a portion on the side with the base wall portion 12B of the front-side bumper RF 12 and corresponds to the inside of the second groove 16D before vibration welding, and a second region 16B2 that forms a portion other than the first region 16B1. At the first region 16B1, the reinforcing fibers 80 are randomly oriented, and some of the plurality of reinforcing fibers 80 are entangled with each other. Also, at the second region 16B2, the reinforcing fibers 80 are oriented in a direction orthogonal to the overlapping direction of the base wall portion 12B of the front-side bumper RF 12 and the base wall portion 16B of the bulkhead 16 (i.e., in a direction perpendicular to the surface of the paper on which FIG. 7B is drawn, as an example).

At a portion of the base wall portion 16B of the bulkhead 16 that is near a boundary portion of the first region 16B1 and the second region 16B2, some of the plurality of reinforcing fibers 80 in the first region 16B1 and some of the plurality of reinforcing fibers 80 in the second region 16B2 are entangled with each other. Moreover, at a portion near a boundary portion of the first region 16B1 of the base wall portion 16B of the bulkhead 16 and the base wall portion 12B of the front-side bumper RF 12, some of the plurality of reinforcing fibers 80 in the first region 16B1 and some of the plurality of reinforcing fibers 80 in the base wall portion 12B of the front-side bumper RF 12 are entangled with each other.

This resultant entanglement of the reinforcing fibers 80 improves the weld strength (joint strength) of the base wall portion 12B of the front-side bumper RF 12 and the base wall portion 16B of the bulkhead 16.

As described above, with the manufacturing method for the bumper RF 10 (joined body) of this example embodiment, weld quality is able to be more stably ensured. Also, continuous welding and surface welding which are advantages of vibration welding are able to be accurately realized, so stable joining is able to be realized without using an adhesive.

With this example embodiment, the welding time is also able to be shortened compared to when vibration welding two members that do not have grooves formed in the joining surfaces, for example.

Supplementary Description of Example Embodiment

As a modified example of the example embodiment described above, other members (e.g., vehicle frame members) such as a rocker outer panel, a rocker reinforcement, and a rocker inner panel, for example, may also be applied as the first member and the second member to be joined together. Also, in the example embodiment described above, as shown in FIG. 1 and the like, the front-side bumper RF 12 is applied as the first frame member, the rear-side bumper RF 14 is applied as the second frame member, and the bulkhead 16 is applied as the reinforcing member, but a rocker outer panel may be applied as the first frame member, a rocker inner panel may be applied as the second frame member, and a bulkhead or a rocker reinforcement may be applied as the reinforcing member, for example.

Also, in the example embodiment described above, a groove is set as the recessed portion, but as a modified example of the example embodiment, a plurality of depressed portions as a recessed portion that does not form a groove (in other words, a recessed portion that is not elongated) may be set in series spaced apart, instead of a groove, for example. Also, the groove as the recessed portion may be a plurality of grooves that are parallel to each other.

Also, in the example embodiment described above, the pair of side wall portions of the first groove 14D and the pair of side wall portions of the second groove 16D are inclined so as to come closer together toward the groove bottom side, but a pair of side wall portions of a recessed portion (including the first groove and the second groove) may be set perpendicular to the groove bottom surface.

Also, in the example embodiment described above, the second groove 16D shown in FIG. 2 reaches the end of the bulkhead 16 on the side arranged on the outside in the vehicle width direction (i.e., on the other side in the longitudinal direction of the bulkhead 16), but the second groove may also be formed not reaching the end of the bulkhead 16 on the side arranged on the outside in the vehicle width direction (i.e., on the other side in the longitudinal direction of the bulkhead 16).

Also, as a modified example of the example embodiment described above, only the flange portion 12F of the front-side bumper RF 12 and the flange portion 14F of the rear-side bumper RF 14 may be vibration welded, for example. Also, as another modified example, only the base wall portion 12B of the front-side bumper RF 12 and the base wall portion 16B of the bulkhead 16 may be vibration welded, for example.

Also, in the example embodiment described above, the bulkhead 16 as the reinforcing member is provided in a pair, but a reinforcing member as a second member to be welded that is arranged inside a closed cross-section 20 may also be singular.

Also, as a modified example of the example embodiment described above, the flange portions 16F of the bulkhead 16 and the base wall portion 14B of the rear-side bumper RF 14 may be joined by a well-known joining method other than vibration welding (welding as an example).

Also, as a modified example of the example embodiment described above, a groove as a recessed portion may be formed on the joining surface 16C of the flange portions 16F of the bulkhead 16. Such a groove may extend in the longitudinal direction of the flange portions 16F of the bulkhead 16.

Also, as a modified example of the example embodiment described above, one of the front-side bumper RF 12 and the rear-side bumper RF 14 may be made of material other than thermoplastic resin. For example, the front-side bumper RF 12 may be made of metal.

Also, as a modified example of the example embodiment described above, frictional heat may be generated by relative movement, such as circular movement.

Also, in this specification, the concept of "extending over substantially the entire length thereof" includes a case of something reaching both ends of a flange portion 14F in the longitudinal direction of a second member (the rear-side bumper RF 14 as the second frame member) (i.e., extending over the entire length), like the first groove 14D shown in FIG. 2 of the example embodiment described above, as well as a case in which, as a whole, it is understood that something generally extends over the entire length of a flange portion 14F in the longitudinal direction of a second member (the rear-side bumper RF 14 as the second frame member), even though it does not reach at least one end of the flange portion 14F in the longitudinal direction of the second member (the rear-side bumper RF 14 as the second frame member).

The example embodiment and plurality of modified examples described above may be carried out in combination as appropriate.

What is claimed is:

1. A manufacturing method for a joined body, comprising:
   (a) bringing a first member and a second member into contact with each other, at least one of the first member and the second member being made of thermoplastic resin, and the second member having a recessed portion on a joining surface to be joined to the first member; and
   (b) welding the first member and the second member together, including welding a contact portion of the first member and the second member by melting the at least one of the first and second members that is made of the thermoplastic resin by frictional heat, the frictional heat being generated in the contact portion by relative movement of the first member and the second member in a state in which the first member and the joining surface of the second member are in contact with each other and are pressed together, wherein
   the first member and the second member each (i) are formed in an elongated shape having a longitudinal direction, (ii) have a shape in a sectional view orthogonal to the longitudinal direction that is hat-shaped, and (iii) include a pair of flange portions and a U-shaped portion with a U-shaped cross-section;
   each of the U-shaped portions has a base wall portion and a pair of facing wall portions, the first member includes a first frame member for a vehicle, the second member includes a second frame member for the vehicle, the first frame member and the second frame member form a closed cross-section by the pair of flange portions of each of the first frame member and the second frame member being joined together;
   the second member includes a reinforcing member that is arranged inside the closed cross-section and is different from the second frame member, the recessed portion of the second frame member is a first groove that is formed on a joining surface of the flange portions of the second frame member, and extends over substantially an entire length of the second frame member in a longitudinal direction of the second frame member, and a recessed portion of the reinforcing member is a second groove that is formed on an outer surface of the base wall portion of the U-shaped portion of the reinforcing member and extends in a longitudinal direction of the reinforcing member, and does not reach an end on at least one side in the longitudinal direction of the reinforcing member;
   the step (b) includes arranging the reinforcing member inside the U-shaped portion of the second frame member and joining the flange portions of the reinforcing member to an inner surface side of the base wall portion of the U-shaped portion of the second frame member, while one end of the reinforcing member in the longitudinal direction of the reinforcing member is positioned closer than the other end is to a side of a center portion of the second frame member in the longitudinal direction of the second frame member; and
   the step (b) also includes bringing the joining surface of the flange portions of the second frame member into contact with the joining surface of the flange portions of the first frame member, and bringing the outer surface of the base wall portion of the U-shaped portion of the reinforcing member into contact with an inner surface of the base wall portion of the U-shaped portion of the first frame member, and welding by pressure and vibration.

2. The manufacturing method according to claim 1, wherein
   the step (b) includes welding the recessed portion of the second member and a facing portion that faces the recessed portion together, by introducing melted thermoplastic resin into the recessed portion.

3. The manufacturing method according to claim 2, wherein
   the step (b) includes melting the recessed portion of the second member, the facing portion, and the thermoplastic resin introduced into the recessed portion, by heat transferred from the contact portion to the recessed portion and the facing portion.

4. The manufacturing method according to claim 1, wherein
   the relative movement is vibration of at least one of the first member and the second member.

5. The manufacturing method according to claim 1, wherein the first member and the second member are made of thermoplastic resin.

6. The manufacturing method according to claim 5, wherein reinforcing fibers are blended into the first member and the second member.

7. The manufacturing method according to claim 1, wherein the reinforcing member is provided in a pair, and the step (b) is performed after arranging the reinforcing members on both sides of the U-shaped portion of the second frame member in the longitudinal direction of the second frame member at an inside of the U-shaped portion of the second frame member while end portions on one side in the longitudinal direction of the reinforcing members are facing each other, and joining the flange portions of the reinforcing members to the inner surface side of the base wall portion of the U-shaped portion of the second frame member.

\* \* \* \* \*